United States Patent [19]
Snarskis

[11] 3,747,168
[45] July 24, 1973

[54] CLAMP ASSEMBLY
[75] Inventor: Bronius Snarskis, Brecksville, Ohio
[73] Assignee: General Motors Corporation, Detroit, Mich.
[22] Filed: Nov. 8, 1971
[21] Appl. No.: 196,468

[52] U.S. Cl. .................................. 24/221 R, 85/9
[51] Int. Cl. ........................................... A44b 17/00
[58] Field of Search ..................... 24/221, 212, 98, 24/221 A, 211 P; 85/9; 287/20.5, DIG. 8, 189.36

[56] References Cited
UNITED STATES PATENTS

| 1,785,709 | 12/1930 | Campau | 24/221 R |
| 3,468,211 | 9/1969 | Suan | 285/9 R |
| 1,062,921 | 5/1913 | Kinsel | 24/221 R |
| 1,383,630 | 7/1921 | Hoagland | 85/9 R |
| 1,426,098 | 8/1922 | Pruitt | 85/9 R |
| 3,571,864 | 3/1971 | Oger | 24/221 R |

FOREIGN PATENTS OR APPLICATIONS

| 329,977 | 8/1903 | France | 24/221 R |
| 4,171 | 7/1912 | Great Britain | 85/9 R |
| 597,934 | 2/1948 | Great Britain | 85/9 R |
| 271,733 | 7/1964 | Netherlands | 85/9 R |

Primary Examiner—Bernard A. Gelan
Attorney—J. L. Carpenter and E. J. Biskup

[57] ABSTRACT

A clamp assembly having a bushing member which extends through registering holes provided in two parts and serves to align the holes and to secure the two parts together by the rotation of an eccentrically carried lock pin followed by the threading of a lock nut.

2 Claims, 3 Drawing Figures

PATENTED JUL 24 1973  3,747,168

CLAMP ASSEMBLY

The invention concerns a clamp assembly for securing two parts together and more particularly to a clamp assembly that is used for clamping fixtures to a surface table.

In the manufacture of various off-highway products, such as front end loaders, scrapers and haulers, it is quite common to use a rectangular surface table for supporting the large welded assemblies which are built in small quantities. The surface table is normally placed on the plant floor and has a leveling screw located at each corner of the table for maintaining the latter in a horizontal plane. The leveling screws space the top surface of the surface table a predetermined distance from the floor and, in most cases, several tables are combined for providing a single work station. Each of the tables has a plurality of cylindrical holes formed therein in a grid fashion with the spacing between the centers of the holes being uniform and held to close tolerances.

Support tables of the above-described type serve to support fixtures which are used for assembling and aligning the various parts which are to be welded together or otherwise joined during the manufacturing process. In order to maintain the fixtures in a predetermined position on the surface table, a number of clamp assemblies are employed which serve to secure the fixture to the table and also provide accurate relationship between the fixture components. The present invention contemplates a clamp assembly of this type which includes a bushing member which provides an aligning function. In addition, the bushing member is intended to absorb side thrusts and to serve as a carrier for an eccentrically located lock pin which cooperates with a lock nut for providing the required clamping force which holds the fixture to the support table. The bushing member, lock pin, and lock nut are combined as a unit so as to provide an assembly that will extend into aligned holes formed in the fixture and support table. In one position of the lock pin, a lock tab integrally formed with the lock pin is located within the cross-sectional confines of the bushing member. By rotating the lock pin 180°, the lock tab is moved outside the cross-sectional confines of the bushing member and into a position wherein tightening of the lock nut results in the clamping action which serves to secure the fixture to the support table.

The objects of the present invention are to provide a clamp assembly for holding a fixture on the upper surface of a support platform having a purality of cylindrical holes formed therein; to provide a fastener having a portion which extends through registering holes provided in two parts and serves to secure the two parts together by the rotation of an eccentrically carried lock pin and the threading of a lock nut; to provide a securement device which includes a bushing that extends through a pair of axially aligned holes formed in two parts and carries a rotatable lock pin which together with a lock nut serves to clamp the two parts together; and to provide a clamp assembly having a lock pin that is adapted to extend through a fixture into an accommodating cylindrical hole in a support platform and includes an eccentrically located tab which is rotated into a position wherein it will engage the lower surface of the support plateform and cooperate with an upper part of the assembly to secure the fixture to the support platform.

Other objects and advantages of the present invention will be apparent from the following detailed description when taken with the drawing in which.

Figure 1:
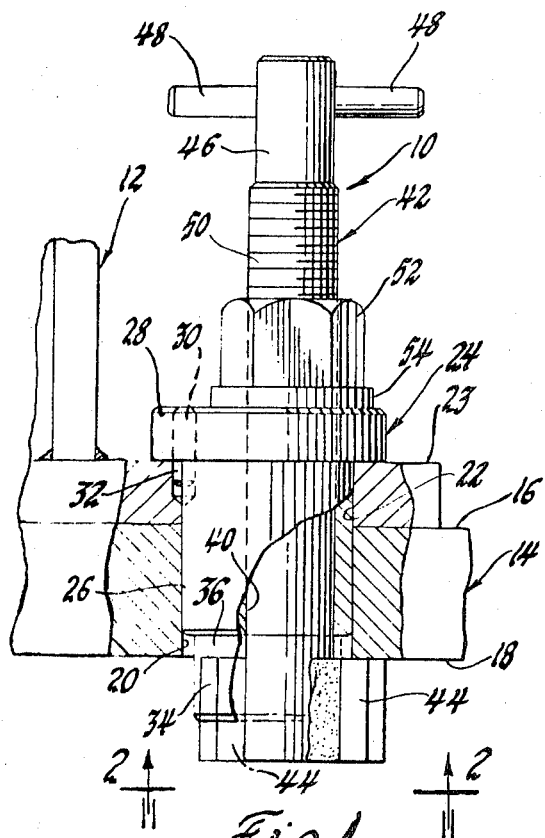
FIG. 1 is an elevational view showing a clamp assembly made in accordance with the invention.

Referring to the drawing, a clamp assembly 10 made in accordance with the invention is shown being used for rigidly securing a fixture 12 to a surface table 14. The surface table 14 serves as a support platform for fixtures which in turn can be used for supporting components which are to be assembled. In this regard, a surface table of the latter-mentioned type can be utilized in a manufacturing process wherein fixtures are used for combining and aligning parts which are to be welded together.

Figure 3:
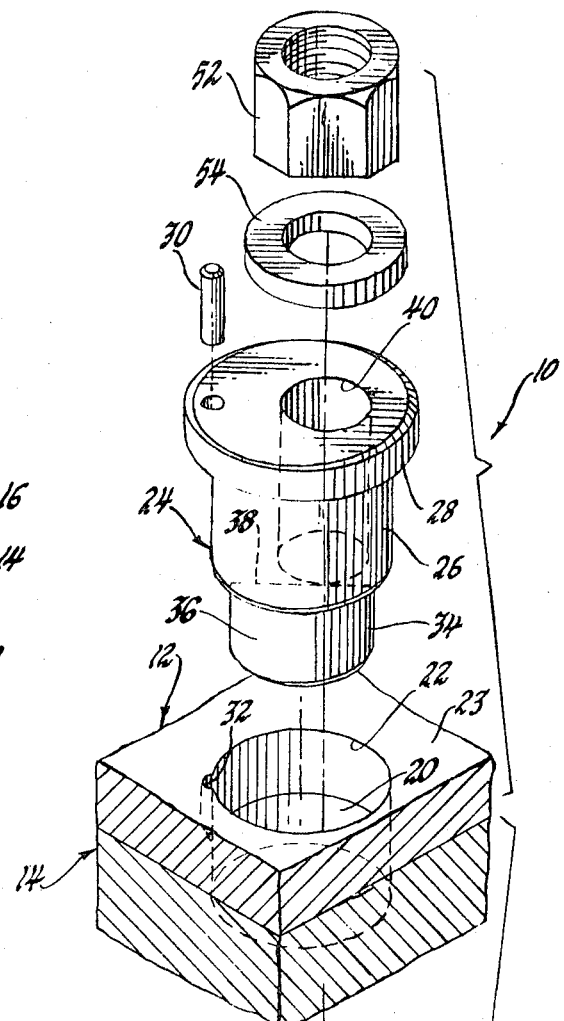
FIG. 3 is an exploded view showing the various parts of the clamp assembly of FIGS. 1 and 2.
Figure 3:
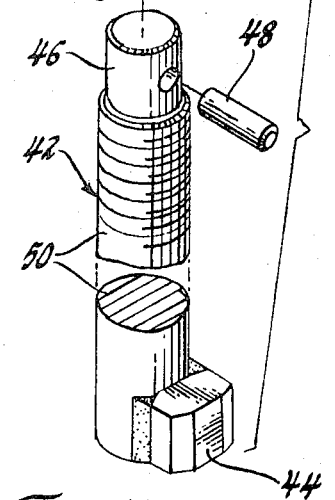

The surface table 14 consists of a generally rectangular flat plate having parallel surfaces 16 and 18, and is formed with a plurality of identical cylindrical holes, one of which is shown in the drawing and identified by the reference numeral 20. The centers of the holes 20 are arranged in a grid system and are uniformly spaced from each other along mutually perpendicular lines which lie in the plane of surface 16. It will be understood that each fixture to be supported on surface 16 will have a plurality of cylindrical holes drilled therein which preferably will be of the same diameter as each hole 20 and will be accurately spaced relative to each other so as to permit the fixture to be located in a predetermined position on the upper surface 16 of the surface table 14. In this regard and as seen in FIGS. 1 and 3, fixture 12 has one of the latter-mentioned holes identified by the reference numeral 22 and located in a plate-like flange portion 23 of the fixture 12.

Figure 2:
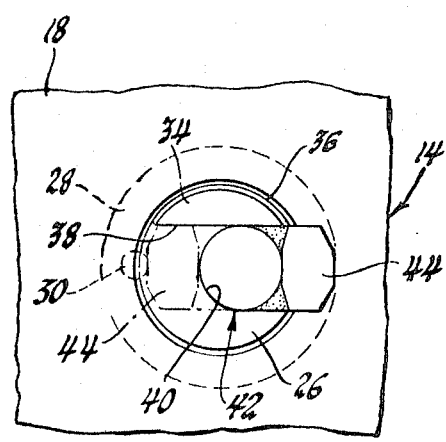
FIG. 2 is a view taken on line 2—2 of FIG. 1.

More specifically, the clamp assembly 10 comprises a bushing member 24 having a cylindrical body portion 26 which is adapted to extend into the aligned holes 22 and 20 formed in the fixture and the surface table. The outside diameter of body portion 26 is slightly less than the inside diameter of the aligned holes 20 and 22 so as to provide a snug fit between the holes and the bushing member 24. As seen in FIGS. 1 and 3, the upper portion of the bushing member 24 is formed with an enlarged head 28 which is adapted to seat on the upper surface of the fixture 12 when the bushing member is inserted into the aligned holes 20 and 22. A pin 30 extending through the enlarged head 28 is located in a bore 32 formed in the upper surface of the fixture 12 so as to prevent relative rotation between the bushing member 24 and the fixture 12. A stop member 34 is integrally formed with the lower end of the bushing member 24 and as seen in FIG. 2, has an arcuate outer surface 36 which is in axial alignment with a portion of the peripheral surface of the cylindrical body portion 26. The stop member is also formed with an end wall 38 which lies in a plane that is tangent to an eccentrically located bore 40 which extends through the body portion 26 and the head 28 of the bushing member 24. As seen in FIG. 1, it should be apparent that the longitudinal center axis of the bore 40 is offset from and parallel to the longitudinal center axis of the bushing member 24.

A lock pin 42 is rotatably supported within the bore 40 and has the lower end thereof formed with a radially extending lock tab 44 having a pair of spaced parallel side walls. The upper end of the lock pin 42 has a reduced diameter portion 46 which carries a rod type handle 48 that can be manually grasped so as to provide rotation of the lock pin 42. Adjacent to the reduced diameter portion 46 and immediately below therefrom is a threaded portion 50 which accommodates a lock nut 52 which is adapted to seat on a washer 54 which in turn rests on the enlarged head 28 of the bushing member 24.

The clamp assembly 10 described above can be assembled by first having the reduced diameter portion 46 of the lock pin 42 inserted into the lower end of the bore 40 formed in the bushing member 24. Thereafter, the washer 54 and lock nut 52 are assembled to the upper end of the lock pin 42 with the lock tab 44 abutting end wall 38 and being held in the phantom line position shown in FIG. 2 as provided by the stop member 34. At this time, the lock nut 52 should only be rotated a few turns so it is threaded on the upper end of the threaded portion 50. The handle 48 is then inserted into an accommodating bore located in the reduced diameter portion 46 of the lock pin 42.

After all of the components of the clamp assembly 10 are combined as described above, a self-contained clamping unit is provided which is in a condition for securing a fixture to the surface table 14. In this regard, the clamping function can be accomplished by first inserting the cylindrical body portion 26 of the bushing member 24 into the registering holes 22 and 20 formed in the fixture 12 and the surface table 14 as seen in FIG. 1. Care should be taken to assure that the pin 30 is located in the bore 32 to prevent the bushing member 24 from rotating relative to the fixture 12, and also the lock tab 44 should be located below the surface 18. Also during insertion, the lock tab 44 should be located within the confines of the cross-sectional area of bushing member 24 so that the lower end of the clamp assembly 10 can readily pass through the aligned holes 20 and 22 until the head 28 is seated on the flange 23 of fixture 12 as seen in FIG. 1. The lock pin 42 is then rotated 180° so as to move the lock tab 44 from the phantom line position wherein one side wall of the lock tab 44 is in surface-to-surface contact with the end wall 38 to the full line position of FIGS. 1 and 2 wherein the other side wall is in surface-to-surface contact with the end wall 38 of stop member 34. At this time, the lock tab 44 is located outside the confines of the cross-sectional area of the bushing member 24 adjacent to the lower surface 18 of the surface table 14. Thereafter, the lock nut 52 is rotated on the threaded portion 50 so as to cause the lock pin 42 to be drawn axially upwardly to cause the fixture 12 and the surface table 14 to be clamped together between the lower surface of the enlarged head 28 and the lock tab 44. In order to remove the clamp assembly 10, the steps mentioned above are reversed. In other words, the lock nut 52 is first loosened followed by a rotation of the lock pin 42 to the phantom line position of FIGS. 1 and 2 so that the lock tab 44 is once again located within the confines of the hole 20 and the body portion 26. Thereafter, the clamp assembly 10 can be removed as a unit from the accommodating holes 20 and 22.

Various changes and modifications can be made in this construction without departing from the spirit of the invention. Such changes and modifications are contemplated by the inventor and he does not wish to be limited except by the scope of the appended claims.

I claim:

1. A clamp assembly adapted to be located within two axially aligned holes formed in a pair of members for securing the latter together, said clamp assembly comprising a bushing member having a body adapted to be located in said holes, said body being of a size and shape which prevents relative movement of the members along an axis perpendicular to the longitudinal axis of the bushing member when the latter is located in said holes, an enlarged head extending radially from and integrally formed with said body for contacting one of said members and preventing the bushing member from extending into said holes beyond a predetermined point, means passing through said enlarged head and cooperating with said one of said members for preventing said bushing member from rotating about its longitudinal center axis relative to said pair of members when located in said holes, a lock pin extending through said body of said bushing member and carried thereby for axial movement relative thereto and for rotation about an axis parallel to and offset from the longitudinal center axis of said body, one end of said lock pin having a lock tab projecting radially outwardly therefrom adjacent the other of said members, said lock tab having a pair of spaced parallel side walls and being formed so that rotation of said lock pin to a first position locates the lock tab within the cross-sectional confines of said body and rotation of the lock pin to a second position places the lock pin outside the cross-sectional confines of said body, means carried by the other end of the lock pin and cooperating with said enlarged head of said body for causing the lock tab to be drawn axially into frictional engagement with said other of said members when the lock pin is located in said second position and thereby cause the members to be clamped together between said enlarged head of the body and the lock tab and a stop member formed on said bushing member for locating said lock tab in said first and second positions, said stop member including a flat end wall which has surface contact with the side walls of the lock tab when the latter is placed in the first and second positions.

2. A clamp assembly for securing a fixture to the upper surface of a support platform having a cylindrical hole formed therein, said clamp assembly comprising a bushing member having a body formed with a first portion that is cylindrical in configuration and adapted to be inserted through said fixture into said cylindrical hole, said body having an enlarged head integrally formed with one end thereof and radiating from said body for contacting the fixture and for preventing the bushing member from extending into said hole beyond a predetermined point, means passing through said enlarged head and cooperating with said one of said members for preventing said bushing member from rotating about its longitudinal center axis relative to said pair of members when located in said holes, a lock pin extending through said first portion of said bushing member and being carried by the latter for axial movement relative thereto and for rotation about an axis parallel to and offset from the longitudinal center axis of said first portion, one end of said lock pin having a lock tab projecting radially outward therefrom adjacent the lower surface of the support platform, the lock tab having a pair of spaced parallel side walls and being formed so that rotation of said lock pin to a first position locates the lock tab within the cross-sectional confines of said first portion and rotation of the lock pin to a second position places the lock pin outside the cross-sectional confines of said first portion, a nut threadably carried by the other end of the lock pin and adapted to cooperate with said enlarged head of said body for moving the lock pin axially relative to the bushing member and causing the lock tab to be drawn into frictional engagement with said lower surface of the platform when the lock pin is located in said second position to thereby cause the fixture and the platform to be clamped together between said enlarged head and the lock tab and a stop member formed on the other end of said bushing member for locating said lock tab in said first and second position, said stop member including a flat end wall which has surface contact with each side wall of the lock tab when the latter is placed in the first and second positions.

* * * * *